UNITED STATES PATENT OFFICE.

DAVID H. CHILDS, OF ALFRED, NEW YORK.

PROCESS OF PRODUCING ALUMINA.

1,036,454.

Specification of Letters Patent. Patented Aug. 20, 1912.

No Drawing. Application filed August 15, 1910, Serial No. 577,280. Renewed June 4. 1912. Serial No. 701,654.

*To all whom it may concern:*

Be it known that I, DAVID H. CHILDS, a citizen of the United States, residing at Alfred, in the county of Allegany and State of New York, have invented a new and useful Improvement in Processes of Producing Alumina, of which the following is a specification.

This invention relates to the process of producing aluminum oxid or alumina, as it is called, from minerals, ores or compounds which contain silicates of aluminum alone or compound silicates of aluminum and other materials, and particularly to those compounds in which the aluminum silicate is present in large quantities. For this purpose clay, bauxite and other compounds containing aluminum silicate may be used, but for commercial purposes kaolin is preferred because of its abundance and cheapness and also for the reason that it is a clay of a high degree of purity which contains a large percentage of aluminum silicate and is practically free from iron and other foreign substances. In the treatment of these materials to produce alumina, it is important that all the necessary reactions should take place without requiring fusion of the material as any fusion process is slow in operation, requires a thorough calcination of the material before being treated and entails the employment of electric furnaces and other expensive apparatus which greatly increase the expense of the process and destroy its desirability from a commercial standpoint.

The object of this invention is to provide a process of producing alumina from materials containing aluminum silicate which is simple and inexpensive, requires no fusion of the material and can be successfully operated in a commercial manner.

The process consists in mixing the kaolin or other substance to be treated with a suitable amount of aluminum fluorid which is determined by the amount of aluminum silicate present in the material used, those substances containing a large amount of aluminum silicate, such as kaolin, requiring a greater proportional amount of aluminum fluorid than those containing a small amount of aluminum silicate, such as bauxite. Approximately four pounds of aluminum fluorid are required for each pound of silica, whether free or combined, contained in the material used. This mixture is then heated to a temperature which is sufficient to cause the fluorin to combine with the silica to produce a volatile compound of silicon and fluorin which passes off as a gas, leaving aluminum oxid as a solid. The temperature at which this reaction takes place is considerably less than that required for producing a fusion of the material, and this makes it possible to employ an oil or gas furnace of common construction for heating the material. When no water is present in the mixture, water or water vapor is added thereto during the heating operation to facilitate the reaction of the fluorin with the silica.

In carrying out the process with kaolin, I take a suitable quantity of aluminum fluorid which has been ground to a fine powder and thoroughly mix it with about one-half its weight of kaolin. The mixture is then heated in a suitable oil or gas furnace, preferably in contact with the flame, to a temperature which must be less than the melting point of alumina and should not exceed 2500° F. For ordinary commercial purposes, a temperature of from 1600° F. to 1800° F. has been found sufficient to produce the necessary reaction. At this temperature the fluorin will combine with the silica in the kaolin and the silicon fluorid so formed will pass off as a gas, leaving the aluminum oxid as a solid remaining in the furnace. The temperature necessary to produce the reaction varies considerably with the material treated and may be greater or less than that above given but is never high enough to produce a fusion of the mixture. The mixture contains some water before heating, but it is advisable, especially when calcined kaolin is being treated, to add a further quantity of water or water vapor during the heating process to facilitate the reaction. This may be done by means of a water or steam jet which is arranged to discharge directly into the furnace. The aluminum oxid remaining in the furnace is practically free from all foreign matter and requires no further treatment to prepare it for use commercially.

I claim as my invention:

1. The process of producing aluminum oxid from a substance containing aluminum silicate which consists in mixing such substance with aluminum fluorid and heating the mixture to a sufficiently high temperature to cause the fluorin to react upon the silica without causing fusion thereof, and produce a volatile compound of silicon and fluorin leaving aluminum oxid as a solid, substantially as set forth.

2. The process of producing aluminum oxid from a substance containing aluminum silicate which consists in mixing such substance with aluminum fluorid and heating the mixture in the presence of water to a sufficiently high temperature to cause the fluorin to react upon the silica without causing fusion thereof, and produce a volatile compound of silicon and fluorin leaving aluminum oxid as a solid, substantially as set forth.

3. The process of producing aluminum oxid from kaolin which consists in mixing the kaolin with aluminum fluorid and heating the mixture to a sufficiently high temperature to cause the fluorin to react upon the silica in the kaolin without causing fusion thereof, and produce a volatile compound of silicon and fluorin, leaving aluminum oxid as a solid, substantially as set forth.

4. The process of producing aluminum oxid from kaolin which consists in mixing the kaolin with aluminum fluorid in substantially the proportion of one part in weight of the kaolin to two parts in weight of the fluorid and heating the mixture to a temperature of approximately 1600° F. to 1800° F. which causes the fluorin to react upon the silica in the kaolin and produces a volatile compound of silicon and fluorin, leaving aluminum oxid as a solid, substantially as set forth.

Witness my hand in the presence of two subscribing witnesses.

DAVID H. CHILDS.

Witnesses:
 HORAN MACK,
 MAUD JORDAN.

Copies of this patent may be obtained for five cents each, by addressing the "Commissioner of Patents, Washington, D. C."